United States Patent [19]
Lyman et al.

[11] Patent Number: 4,584,041
[45] Date of Patent: Apr. 22, 1986

[54] METHOD OF MAKING A CONTAINMENT VESSEL

[75] Inventors: Richard R. Lyman, Bountiful, Utah; Robert W. Taylor, Westminster, Calif.

[73] Assignee: Lear Siegler, Inc., Santa Monica, Calif.

[21] Appl. No.: 487,225

[22] Filed: Apr. 21, 1983

[51] Int. Cl.$^4$ .................. B65H 81/00; B29D 9/04
[52] U.S. Cl. .................................. 156/156; 156/172; 156/192; 156/287; 264/512; 264/516
[58] Field of Search ............... 156/156, 170, 172, 171, 156/189, 192, 187, 287, 161, 162; 244/135 R, 135 B, 123; 428/35, 36; 220/1 B, 83, 5 A, DIG. 23, 900, 902; 264/512, 513, 515, 516, 523, 529, 528, 547, 563, 565, 573

[56] References Cited
U.S. PATENT DOCUMENTS

| | | | |
|---|---|---|---|
| 3,282,757 | 11/1966 | Brussel | 156/172 |
| 3,801,402 | 4/1974 | Suter | 264/512 |
| 3,919,373 | 11/1975 | Kormandi | 264/516 |
| 4,130,617 | 12/1978 | Wallace | 264/528 |

FOREIGN PATENT DOCUMENTS
2730667 1/1979 Fed. Rep. of Germany ...... 264/512

OTHER PUBLICATIONS
BF Goodrich Company, Chemical Group-Product Data Sheet for Estane Polyurethanes-Sep. 1981.

Primary Examiner—Michael Ball
Attorney, Agent, or Firm—Edward J. DaRin

[57] ABSTRACT

Containment vessels including external aircraft fuel tanks having an internal plastic liner compatible with the substance to be stored in the vessel or tank. The plastic liner is manufactured from a cold formable thermoplastic polyurethane elastomer material that can be formed to the desired material configuration of the vessel. In a fuel tank the annular structural elements of the tank can be smoothly enveloped to provide a seamless, fluid tight liner having superior physical and chemical properties.

A method of cold forming the plastic liner from a tubular element to achieve a seamless liner for a containment vessel is disclosed.

6 Claims, 19 Drawing Figures

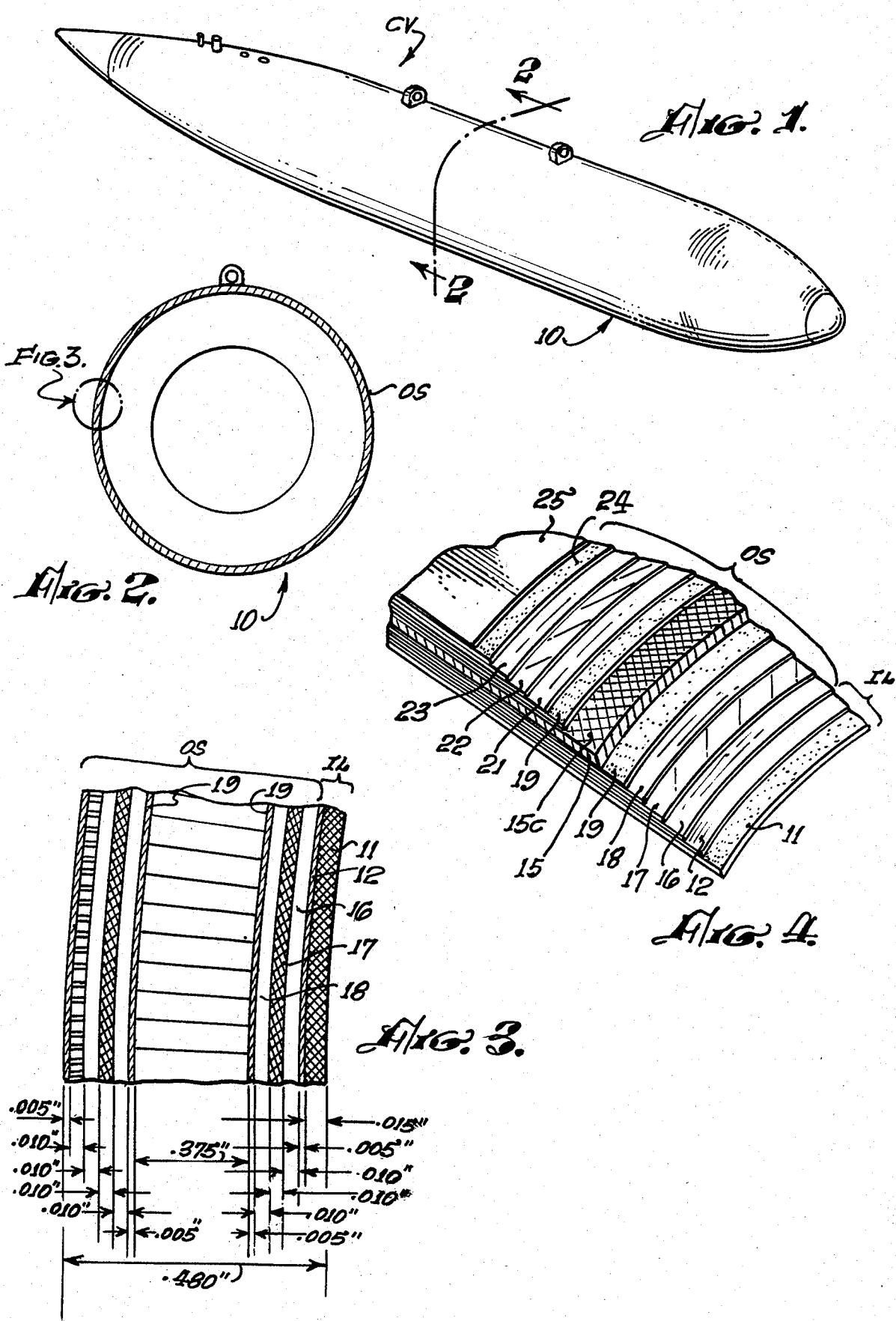

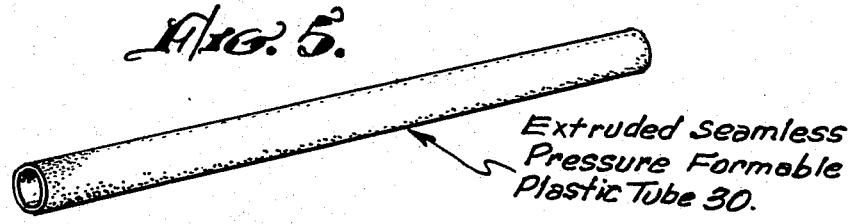
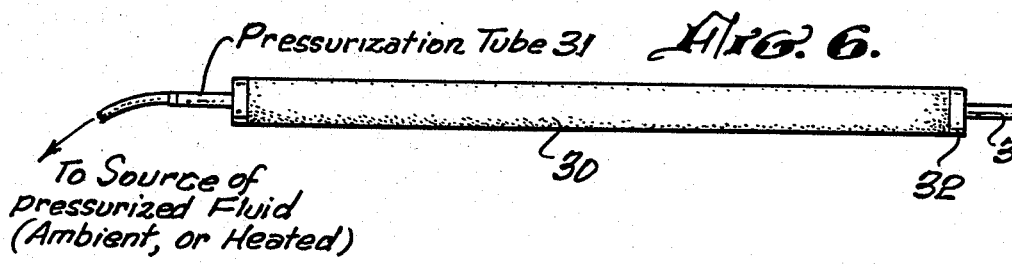
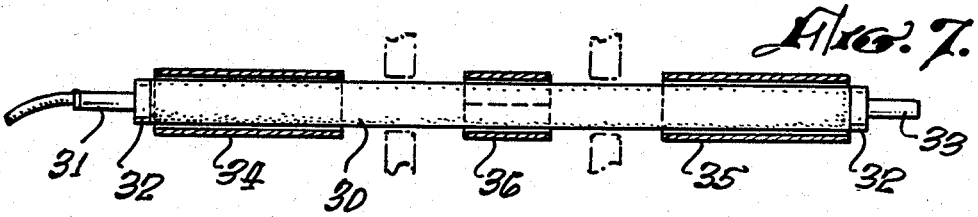
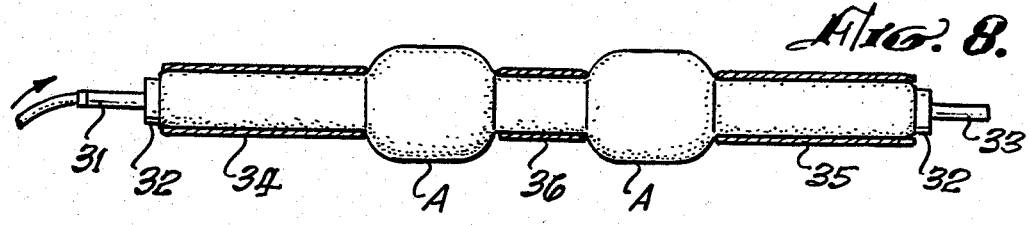
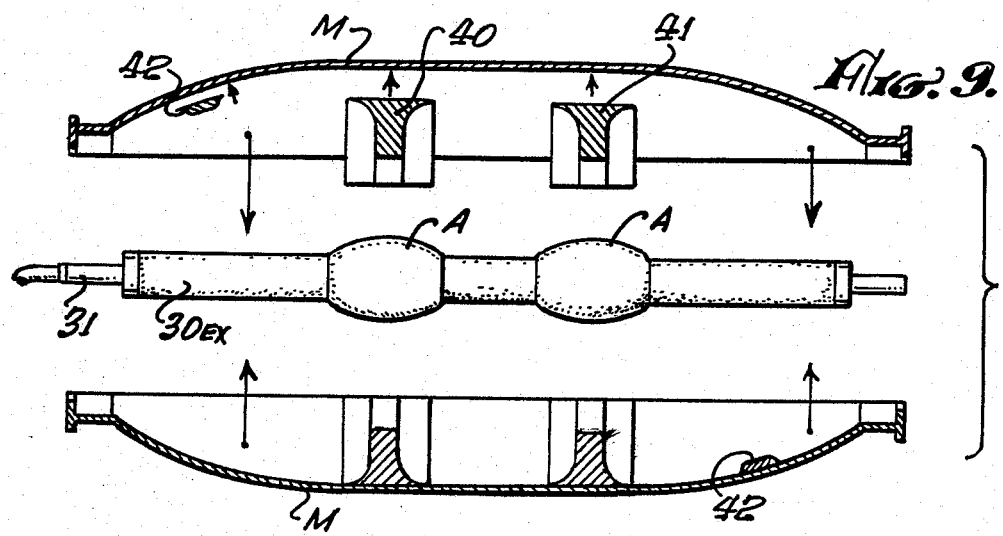

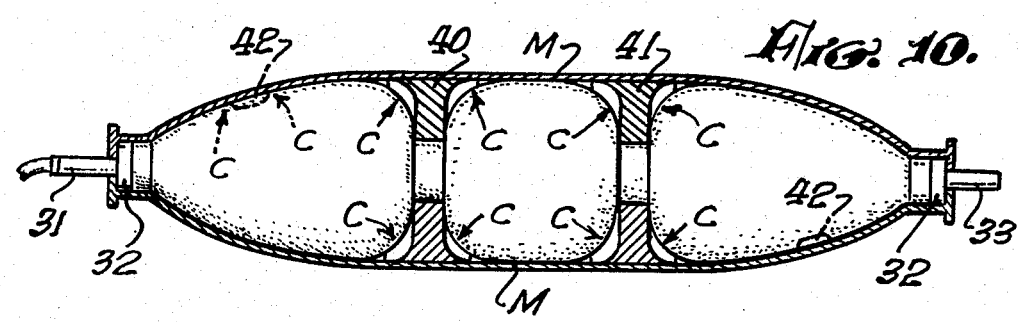
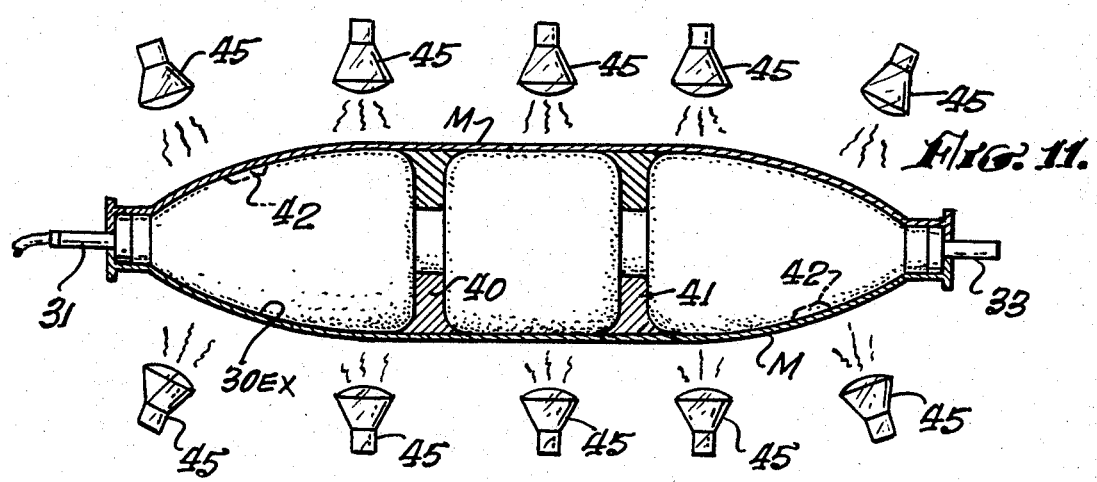
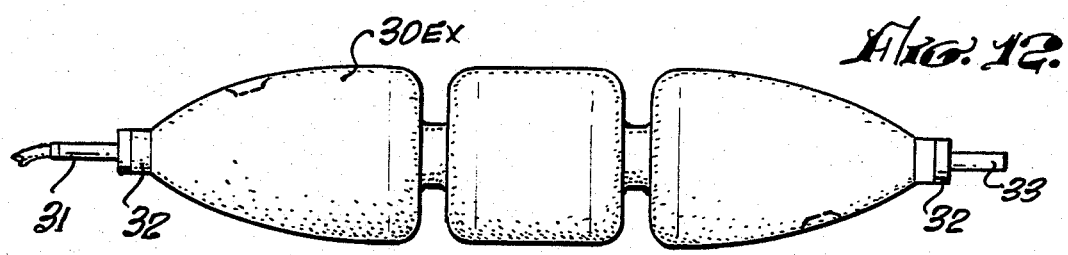
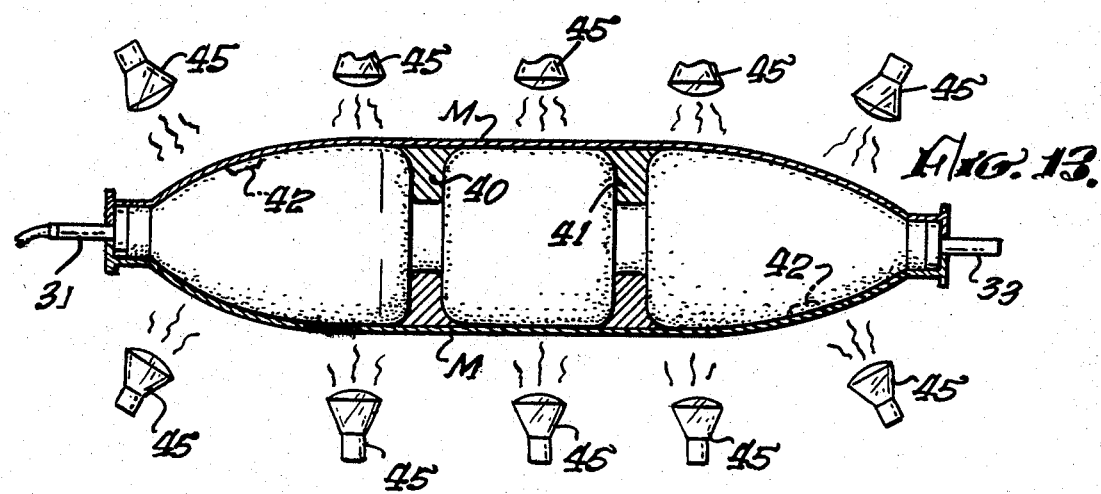

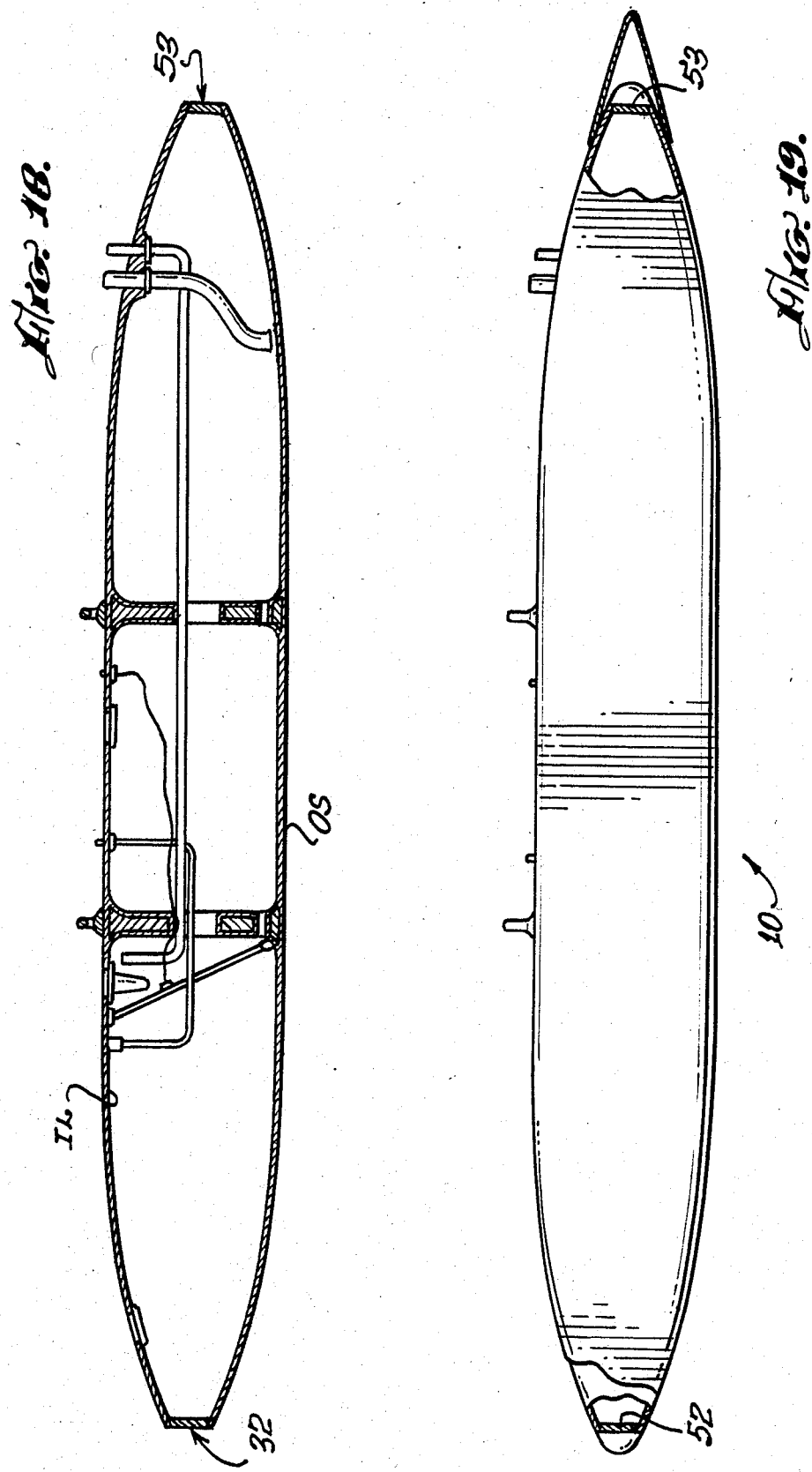

METHOD OF MAKING A CONTAINMENT VESSEL

FIELD OF INVENTION

This invention relates to a containment vessel having an internal plastic liner and the method of manufacturing the vessel, and more particularly, a method of manufacturing a pressurized containment vessel for containment of corrosive and non-corrosive liquids, gases, and solids, and methods of manufacturing the containment vessel including by pressure forming or blow molding techniques.

BACKGROUND OF INVENTION

Specialized containment vessels for storing solids, liquids, and gases are known in the prior art. These prior art containment vessels have been utilized for containment of solid rocket engine propellants, liquids in the form of jet fuels, and gases such as oxygen. These specialized containment vessels are often constructed of lightweight, high strength materials for use in various environments including aircraft and space vehicle environments. In general, it has been found that these prior art containers are often unsatisfactory because they deteriorate, are destroyed, or are too porous to contain the very substance the container was designed to store. In military aircraft applications, for example, jettisonable external aircraft fuel tanks have been conventionally constructed of a lightweight metal, such as aluminum. These aluminum tanks are utilized for extending the range of military aircraft. The recent need for a survivable, external aircraft fuel containment vessel has resulted in the construction of containment vessels that are not all metallic and has generated the production of tanks on a limited scale that utilize lightweight, high strength plastic materials. These survivable tanks have been constructed of various materials and combinations of materials, and require an internal liner that is compatible with the stored fuels. The known survivable, external aircraft fuel tanks have utilized aluminum as an internal liner with a structural outer shell applied by wrapping the aluminum liner with glass filaments bonded together and to the aluminum liner with an epoxy resin. The metal lined fuel tank has been found to be heavy for military aircraft, and does not meet all the specifications of a non-metallic containment vessel. Containment vessels in the form of survivable, external, aircraft fuel tanks have been constructed without utilizing metallic liners, and employing an outer shell constructed of a composite honeycomb structure having fiberglass filaments wound under and over the honeycomb structure with a plastic internal liner compatible with aircraft fuels. These prior art plastic liners have either been constructed as a laminated plastic or rotationally molded plastic. A thick liner wall is required in order to provide a reliable leaktight plastic liner by these prior art manufacturing techniques. The thickness of the plastic liners is so great that it adds an undesirable amount of weight to the containment vessel or aircraft fuel tank. The liner is also expensive to manufacture due to section seam bonding and resulting excessive quality control required.

There has also been developed in the past, containment vessels for non-fuel liquids for internal use aboard aircraft. A containment vessel for internal use aboard aircraft need not have an aerodynamically smooth outer surface, as is required on an external aircraft fuel tank. The requirement for an aerodynamic smooth outer surface on an external aircraft fuel tank renders it necessary to place the structural members or load carrying members and reinforcing members for the outer shell of the tank within the tank to achieve a streamlined outer surface. The prior art internal aircraft liquid tanks that have been developed heretofore utilize a smooth plastic inner liner compatible with the liquid. The outer shell is reinforced with the structural members arranged on the outside of the tank. One such aircraft containment vessel, used for storing drinking water aboard commercial aircraft, utilizes a seamless A.B.S. plastic liner thermally formed into the shape of the interior of the containment vessel. This liner is formed from A.B.S. tubing that has been extruded under high pressure. Metal liners have also been employed in such applications which are fabricated with welded, bonded, or mechanically fastened joints, and are therefore not seamless. Known A.B.S. plastics are not comptible with aircraft fuel additives and, therefore, can't be employed for external aircraft fuel tanks. Accordingly, there is a present need for a lightweight, high strength containment vessel having a relatively lightweight plastic liner that is formable, reliable, inexpensive, leakproof, and is compatible with the stored liquid, gases, or solids, including aircraft fuels having fuel additives therein.

SUMMARY OF INVENTION

The present invention provides an improved, plastic lined containment vessel that can be used as an external, survivable and nonsurvivable aircraft fuel tanks, or the like. The containment vessel incorporates a seamless, thin, plastic, internal liner with a stabilizing shell that is compatible with the substance being stored in the vessel. The plastic liner is formed under pressure and can be molded to envelope structural and nonstructural components internal to the containment vessel's structural shell. This method of processing the plastic liner provides a smooth, seamless, leak-tight interior for the containment vessel which is compatible with the substance to be stored therein. In the embodiment of a containment vessel in accordance with the present invention in the form of a survivable, external aircraft fuel tank, the tank may have an outer shell constructed of composite materials with a fuel compatible, thin, lightweight plastic liner having a smooth, seamless configuration and enveloping the internal members of the tank and bonded to the outer shell. The thin liner avoids the excessive weight problems of prior art plastic lined containment vessels. The use of a cold formable, polyurethane plastic that is thermally stabilized results in a chemical resistant, tear resistant, leaktight, seamless and lightweight plastic liner in accordance with the teachings of the present invention.

From a broad structural standpoint, the present invention comprehends a container comprising a structural outer shell having a preselected configuration and a preselected internal volume, and a thin, seamless, thermoplastic synthetic elastomer material formed to the configuration of the inner wall of the outer shell and bonded thereto in a leaktight manner. The plastic material is further characterized as being formable, chemical resistant, tear resistant, and abrasion resistant.

From a specific structural standpoint, the containment vessel of the present invention comprises an outer shell having a preselected aerodynamic configuration for defining a vessel of a preselected internal volume.

The containment vessel is constructed and defined as a composite honeycomb structure having fiberglass filaments wound under and over a honeycomb layer in a preselected pattern of layers of helical and circumferential wraps and a thermoplastic polyurethane liner bonded to the inside of the inner wraps of the fiberglass filaments. The containment vessel is characterized as including structural frame members and/or structural flat surfaces with the plastic liner being shaped around the frame members and/or flat surfaces in a seamless configuration.

From a method standpoint, the invention comprehends a method of forming a containment vessel having an aerodynamically smooth outer shell and a preselected internal volume with an internal structural element or elements and a non-structural element or element extending into the internal volume from the outer shell, along with a seamless lightweight inner plastic liner covering the inner surfaces of the outer shell and any element or elements extending therefrom. The method includes the steps of providing a seamless, pressure formable plastic tubular element having a preselected wall thickness and length, and then selectively expanding the tubular element at the area or areas of the tubular element corresponding to the location of an internal structural element to a preselected diameter relative to its final diameter. The method includes forming the thus expanded tubular element in a mold having the final configuration for the plastic liner along with any necessary structural or non-structural element or elements to cause the tubular element to be formed into the configuration of the mold with a cavity or cavities formed to accomodate the structural or non-structural element or elements to be mounted therein, and then setting the thus formed plastic liner to its final configuration while removing any "memory" inherent in the plastic element. The method also comprehends adhesively bonding any structural element or non-structural element to the thus formed cavity or cavities accommodating same in the plastic liner to cause the liner to be completely bonded to said element or elements throughout their extent. The method then includes the steps of adhesively wrapping and bonding the preselected structural material around the thus formed plastic liner and any of said elements bonded thereto, and then utilizing the thus formed plastic liner as a mandrel for forming an outer shell around the liner while bonding the two together to provide the desired containment vessel.

BRIEF DESCRIPTION OF THE DRAWINGS

These and other features of the present invention may be more fully appreciated when considered in the light of the following specification and drawings, in which:

FIG. 1 is a generalized perspective view of a survivable, external aircraft fuel tank embodying the present invention;

FIG. 2 is a cross-sectional view of the tank taken along the line 2—2 of FIG. 1;

FIG. 3 is an enlarged cross-sectional view of the layers forming the wall of the tank taken through the section encircled in FIG. 2;

FIG. 4 is a flat perspective view of the successive layers of composite materials making up the wall of the tank of FIGS. 1 and 2;

FIG. 5 is a perspective view of a typical plastic tubular element utilizable to pressure form the plastic liner for a containment vessel in accordance with the manufacturing procedures of the present invention;

FIG. 6 is a front elevational view of the plastic tube of FIG. 5 that has been adapted for pressurization;

FIG. 7 is a front perspective view of the pressure formable plastic tube of FIG. 6 having pressurization restriction sleeves mounted thereto and indicating the final locations of the structural members for the tank of FIG. 1 in dotted outline;

FIG. 8 is a front perspective view of the assembly of FIG. 7 illustrating the plastic tube as it has been prestretched to approximately two-thirds its final diameter;

FIG. 9 is a front view of the stretched plastic tube as illustrated in FIG. 8 with the restriction sleeves removed and mounted in a clamshell mold that is illustrated in cross section along with the structural frame members and the reinforcement depressioned members that are illustrated in section;

FIG. 10 is a cross-sectional view of the closed mold of FIG. 9 illustrating the plastic tube as it is creeping into conformance with the internal structure and structural elements in the closed mold;

FIG. 11 is a cross-sectional view of the closed mold showing the liner in its final configuration and being heated for annealing the liner;

FIG. 12 is a front elevational view of the formed plastic liner as removed from the mold after the annealing step of FIG. 11;

FIG. 13 is a cross-sectional view of the formed plastic liner of FIG. 12 with the structural components in place for bonding thereto under heat;

FIG. 18 is a cross-sectional view of the completed filament wound composite shell having the plastic liner bonded thereto and with the internal hardware and the fluid connections mounted therein; and FIG. 19 is the front elevational view of the completed composite fuel tank of FIG. 1 and illustrating the nose and tail cones in section.

DETAILED DESCRIPTION

Figure 14:
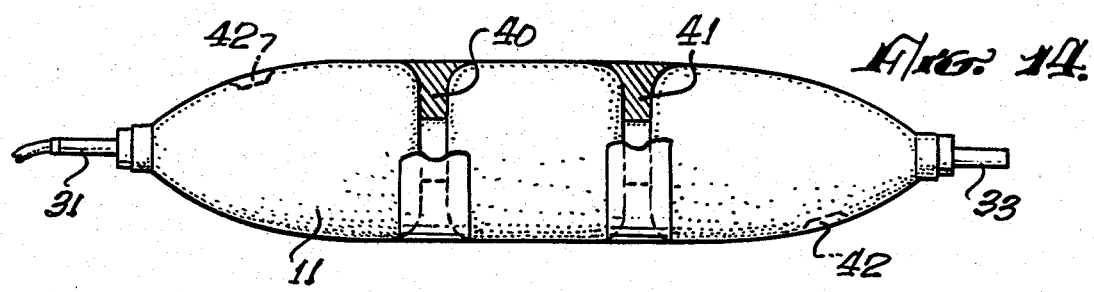
FIG. 14 is a front perspective view of the formed plastic liner, with a portion broken away, when removed from the mold of FIG. 13 and showing the structural elements and non-structural elements bonded to the plastic liner.
Figure 15:
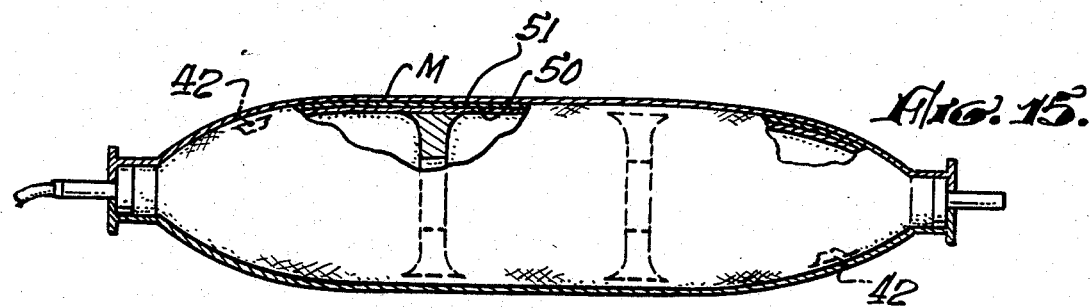
FIG. 15 is a cross-sectional view, of the formed liner of FIG. 14 in the mold and with portions broken away and illustrating the layers wrapped around the plastic liner.
Figure 16:
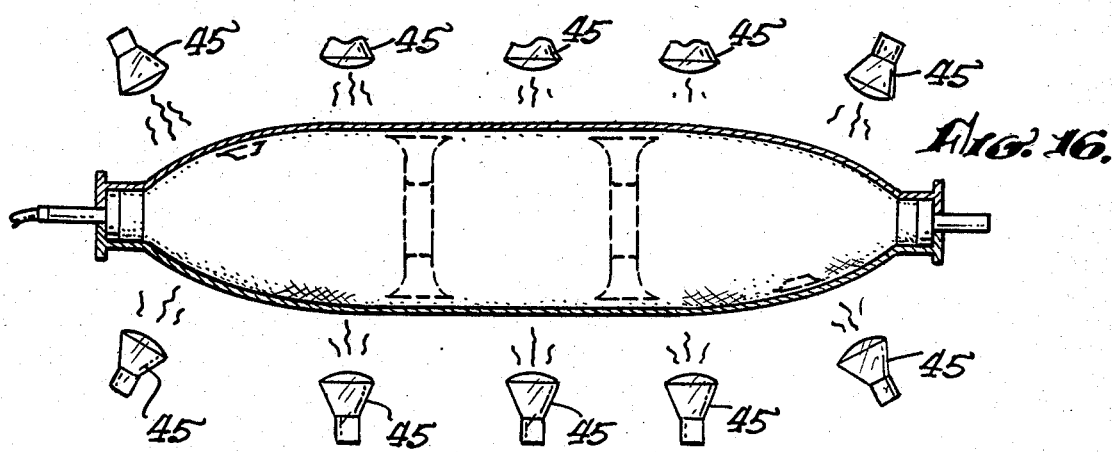
FIG. 16 is the heat treating of the configuration of FIG. 15 for bonding the wrapped outer layers to the plastic liner.
Figure 17:
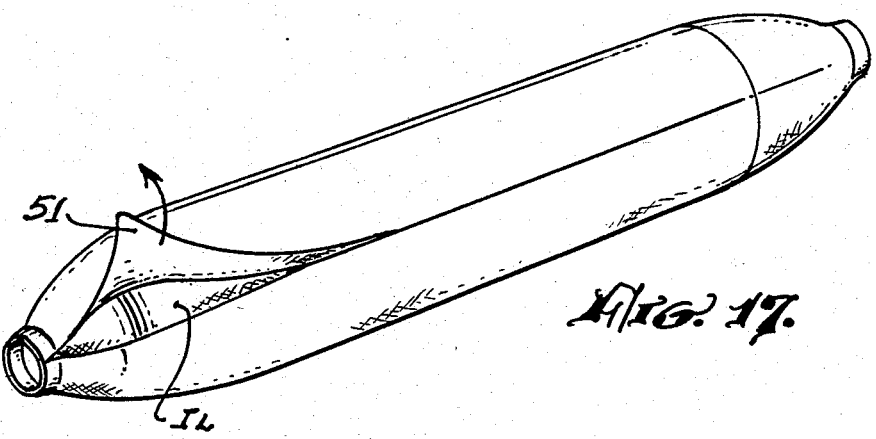
FIG. 17 is a perspective view of the formed plastic liner as removed from the mold of FIG. 16 with the wrapping of peelply about to be removed from the outer surface thereof.

Now referring to the drawings, a containment vessel CV in the form of a survivable, external aircraft fuel tank 10 will be described as a typical end product having a plastic inner liner IL manufactured in accordance with the methods of the present invention. It should be noted at the outset that the description of the survivable external aircraft fuel tank 10 is exemplary of the containment vessels embodying the invention and that similar structures can be constructed of filament wound composites utilizing a synthetic elastomer material or the like, having the necessary physical properties compatible with the substance being stored in the containment vessel, be it a solid, liquid, or gas. Typical examples of such containment vessels that may be produced in accordance with the methods of the present invention are rocket engine cases for containment of solid fuel propellants, containment vessels for drinking water transportable aboard aircraft or other vehicles, and oxygen storage tanks used by fire fighters in fighting fires, all of which containment vessels are preferably constructed in a lightweight, leaktight fashion having a seamless and chemical resistant plastic liner that is compatible with the solid, liquid, or gas, that is being stored therein. It should also be noted that in the manufacture of the plastic liner IL, the liner need not be an integral portion of the containment vessel but merely used as a mandrel for constructing an outer shell OS for the desired end product. These end products generally comprise a structural shape wherein the structural wall is either a solid or composite core rather than being a containment vessel CV. In the cases in which the plastic liner IL is an integral portion of the end product, the expanded liner can double as a mandrel or mold for constructing the outer shell OS, as will be explained hereinafter.

The fuel tank 10 is basically constructed of a structural or load bearing outer shell OS with an inner liner IL bonded thereto. The liner IL illustrated comprises a synthetic elastomeric compound selected for its physical and chemical characteristics that render it physically tough and compatible with the aircraft fuels to be stored in the tank 10. The outer shell OS is constructed and defined as a composite filament wound structure having an overall thickness of approximately 0.480 inches, as illustrated in FIG. 3. The outer shell OS illustrated in the drawings is constructed to be a fire-resistant structure, and can be similarly constructed without the fire-resistant materials therein when this feature is not required. The synthetic elastomeric liner IL is illustrated as comprising a polyurethane plastic material 11 having a reinforcing, or stabilizing, fabric 12 adhesively secured thereto. The plastic liner 11 has a thickness on the order of 0.015 inches with the reinforcing fabric 12 having a thickness on the order of 0.005 inches whereby the stabilized liner IL has an overall thickness on the order of 0.020 inches rendering it very light-weight with respect to known, present day plastic liners utilized in similarly constructed fuel tanks.

The structural shell OS for the tank 10 that overlays the inner liner IL is constructed and defined as a composite of materials formed around the inner liner IL. For this process, the liner IL is used as a tool or mandrel over which the outer shell OS is formed. The structural shell basically is constructed and defined of a layer of structural honeycomb 15 having commercially available structural filaments of fiberglass impregnated with an epoxy resin and wound under and over the honeycomb structure 15. To this end the filament wraps comprise helical windings and circumferential windings arranged in a preselected pattern over and underneath the honeycomb material 15; see FIGS. 3 and 4. In accordance with the present invention, the inner liner IL is formed so that it may be pressurized and function as a mandrel to allow the fiberglass filaments to be wound thereon. This method of manufacturing the inner liner IL will be described in more detail hereinafter. The expanded inner liner IL, then, is filament wound with a layer of circumferential windings 16 wound immediately over the stabilizing fabric 12. The layer of circumferential windings is illustrated in FIGS. 3 and 4 as the layer 16 with a layer of helical filament windings 17 wound thereover and followed with another layer of circumferential windings identified in the drawings as the layer 18. The filament wound layers 16, 17, and 18, and 21, 22, and 23 are wound by means of commercially available filament winding machines.

The fiberglass composite may comprise resin impregnated fiberglass structural plys that are commercially available and applicable to the commercially available winding machines. The filament windings provide a thin membrane of very high strength for the outer shell OS. The layers of reinforcing plastic filaments may be of any commercially available construction such as fiberglass, graphite, nylon, Kevlar, rayon, ceramic, Boron, carbon, asbestos, etc. The resins may be epoxy, polyester, polyurethane, phenolics, polyamide, polyimide, etc. The fiberglass filaments having an epoxy coating have been utilized in such applications successfully. The fiberglass epoxy resins used in a 650 gallon tank can be as thin as 0.030 inches applied to each side of the honeycomb structure 15.

The arrangement of the layers of filament windings under and over the honeycomb material 15 is to cause the fibers to act in tension and minimal compression so that in effect it has approximately five times the strength per unit weight of a typical hollow aluminum fuel tank structure.

When the tank 10 is to have a fire burning resistance characteristic, the empty cells of the honeycomb material 15 can be filled with the char forming isocyanurate foam 15C, as illustrated in FIG. 4. The fire resistant foam 15C is comprised of a commercially available isocyanurate (ICU) foam. The property of the isocyanurate foam that renders it fire resistant is that when it is exposed to a high heat it forms an insulative char of carbonaceous material. The insulative char is effective in flame temperatures up to 2000 degrees Fahrenheit. The isocyanurate foam is also used as a filler material to increase the insulative qualities of the tank. A suitable foam material can be utilized as the core material 15, rather than the honeycomb structure, if desired. The ICU (ISOCYANURATE) foam is effective in insulating the tank 10 at 1800 degrees Fahrenheit, while adding very little weight to the tank 10. The foam density is 2.5 pounds per cubic foot, having a thickness of 3/8 inches. The carbon fiber layer, or fabric 24, while only 0.015 inches thick, surrounds and makes intact the insulation during a fuel-fire burn.

An adhesive layer 19, then, is provided over the top and bottom of the honeycomb structure 15. The filament windings that are wound around the honeycomb material 15 are wound in the same pattern of circumferential, helical and circumferential windings around the honeycomb material 15. As was utilized around the liner IL, these windings are illustrated in the drawings as the circumferential winding 21, helical winding 22, and the circumferential winding 23. On the outside of the circumferential winding 23 a layer of carbon fabric 24 is wrapped around the windings 23. The layer of carbon 24 can be either a fabric or fibers having the ability to remain intact with useful properties at very high temperatures; in excess of 1800 degrees Fahrenheit. The char forming foam 15C and the wrap of carbon 24 are the two fire burning resistance materials that characterize the tank 10 as having a fire burning resistance property. The outer shell OS is completed by the provision of an opaque polyurethane paint 25 covering the fabric 24.

The honeycomb material 15 is a commercially available nylon phenolic honeycomb utilized as the central core material. It has a density of three pounds per cubic foot, and a thickness of approximately ⅜ of an inch. This material is commercially available under the trademark "Nomex", from I. E. DuPont, Wilmington, Delaware.

The outside paint covering 25 for the tank 10 is used to provide color, finish, and a final smoothness for the completed tank. The paint, however, is selected to shield the composite filament materials from ultraviolet light. Although the basic tank 10 is corrosion proof, sunlight has a detrimental effect on the high performance epoxy fiberglass matrix. Also, providing a very good bond of the opaque polyurethane paint layer 25 to the composite structure assures permanent sunlight and weather protection.

The selection of the material for the plastic liner 11 is an important structural feature of any containment vessel CV so that it will be compatible with the substance to be stored therein and not deteriorate or be destroyed or be too porous for the very substance that the containment vessel is designed to store. Of the large number of plastic materials available, a specific polyurethane synthetic elastomer material has been selected for the liner 11 for the fuel tank 10 because of its excellent physical and chemical properties, including its compatability with the aircraft fuel and their additives to be contained in the tank 10. One such polyurethane elastomer that exhibits the desired properties and is commercially available from the B. F. Goodrich Company, Chemical Group, of 6100 Oaktree Boulevard, Cleveland, Ohio, is commercially identified as an Estane Polyurethane 58277 Compound. This synthetic elastomer when formed into a liner exhibits chemical resistance, tear resistance, abrasion resistance, is leaktight, and can be formed as a seamless liner. The specific properties of the Goodrich material are specifically identified in the Goodrich product data sheets and which sheets are incorporated herein by reference. The selected plastic material is formable by cold forming, such as by blow molding, and can also be readily thermally annealed to remove any memory it may have as to its preformed configuration to provide a lightweight, inexpensive liner 11. In addition, the polyurethane elastomer exhibits a high degree of dimensional stability when it is bonded into its final configuration. The dimensional stability of the stabilized plastic liner IL exceeds that of any other inflated or welded plastic material, and most welded metal liners. The ability of the polyurethane elastomer to be thermally annealed or stress relieved at the relatively low temperature of 225 degrees Fahrenheit improves the chemical resistance of the material and eliminates any stress cracking problem, which is common with A.B.S. thermoformed liners. It is known that the A.B.S. plastics do not stress relieve well, and when subjected to very high temperatures will actually pull itself apart. The chemical resistance of the material 11 is also characterized as having very low extractables and is qualified to be used in food contact applications by the U.S. Department of Argriculture and the Food and Drug Administration under their respective regulations. The stabilized thermoplastic elastomer also exhibits excellent low permeability characteristics that far exceed the current requirements of 0.025 ounces per square foot for 24 hours. The thermoplastic polyurethane elastomer has a tensile strength of 8000 pounds per square inch, with a 95A Shore hardness so as to equal or exceed that of any other comparable synthetic elastomer having the same Shore hardness. The tear resistance characteristics of the plastic has been determined to have a Graves tear resistance of 600 pounds per inch per ASTM-D-624 so as to exceed most known elastomers of equivalent Shore hardness. This characteristic is important in the fuel tanks for gunfire resistance which minimizes the amount of leakage due to liner penetration from projectile fragments. The inner liner IL having approximately 0.020 inch thickness also exhibits a weight savings of 75 percent over an aluminum liner having an 0.040 inch thickness and a rotocast thermoplastic liner having a 0.080 inch thickness. The ability to cold form or blow mold the plastic eliminates the need for heating elements which are required for forming the A.B.S. type plastics, and also allows it to be formed in a seamless manner, which is not true of metallic liners.

The aforementioned Goodrich polyurethane material is preformed into a tubular configuration for the purposes of forming the material into the liner 11. For this purpose, a seamless tubular element 30 having a preselected wall thickness and length, is selected in accorance with the desired final configuration of the liner 11. The length of the tubular element is dependent on the end configuration of the internal volume desired for the liner 11. For example, the end configuration of the liner can be flat, hemispheric or ogive so that the correct length of tubular material must be selected for the desired end configuration. The tubular configuration is selected as it may be formed by an extrusion process, without any seams, at pressures of 8,000 to 10,000 pounds per square inch, thus rendering it leakproof when used as a tank liner. The wall thickness of the tubular element 30 is selected to have a constant wall thickness throughout the length of the element so as to render it readily expansible under pressurized conditions. For the purposes of providing the liner 11 for the tank 10 a nominal liner wall thickness in-the range of 0.015 inches, the tubular element 30 should be about 25 percent of the final liner diameter, 400 percent of the final wall thickness, and approximately 93 percent of the final length for the straight sections.

Although the invention will be described by utilizing a tubular element 30 of the same diameter throughout, the element 30 can be pre-formed with variable diameters in accordance with the desired internal configuration for the liner.

With the above considerations in mind and with reference to FIGS. 5 through 17, the method of cold forming the tubular element 30 to form the stabilized liner IL will now be examined in detail. An important aspect of the forming of the liner IL is not only to define a smooth internal volume having the desired configuration, but also to envelope, in a smooth relationship, any reinforcing structural or nonreinforcing element extending into the internal volume from the outer shell OS to provide an entirely smooth, seamless internal wall or liner 11. The extruded, seamless, pressure formable plastic tube 30 is prepared for the pressurization steps by fitting a pressurization tube 31 to the plastic tube 30. The pressurization tube 31 is fixed to one end of the tubular element 30 and is shown at the left hand end of FIG. 6. The tubular element 30 is provided with end fittings 32 fixed to the ends of the tubular element 30. The end fittings 32 are tightly clamped to the ends of the tubular element 30. Although it is a characteristic of the plastic tube 30 that it may be cold formed, the pressurization tube 31 may be connected to a source of ambient pressurized fluid for expanding the tubular element 30 but it will accelerate the procedure if heat is applied to the element 30. To this end, the source of pressurized fluid coupled to the pressurization tube 31 may be a heated fluid or the tube 31 may accommodate a heating element or the like to provide the desired heated, pressurization capabilities. The end fitting 32 for the right hand end of the tubular element 30 may be a blank fitting, or it may be fitted with a guide pin or a shaft 33, as illustrated. If the final containment vessel does not include any structural or nonstructural elements that need to be taken into consideration, the plastic tube 30 having the pressurization tube 31 secured thereto may be placed into a suitable mold such as a clamshell mold having an internal configuration representative of the desired shape for the end product or plastic liner 11.

In the event that the containment vessel CV has reinforcing structural or nonreinforcing components extending into the inside of the containment vessel, it is necessary to preform the plastic tube 30 prior to placing it into a mold. To this end, the plastic tube 30 is provided with external sleeves to restrict the pressurization of the tube at the areas enclosed by the sleeves in response to the application of the pressurized fluid to the pressurization tube 31. In the configuration of the fuel tank 10, reinforcing structural components extend from the outer shell OS and their relative locations are illustrated in FIG. 7 in dotted line. Accordingly, for the relatively straight sections of the tubular element, external sleeves are provided opposite each end to restrict the expansion of the tubular element along with a central sleeve. The sleeve on the left hand end is identified as the sleeve 34, with the sleeve on the right hand end identified as the sleeve 35, and a third sleeve is arranged centrally of the tube 30 and is identified by the reference character 36. With the application of the source of pressurized fluid to the pressurization tube 31, then, the portions of the plastic tube outside the restrictive sleeves will expand to much larger extent than the small expansion permitted by the sleeves 34, 35, and 36. FIG. 8 shows the result of the application of the pressurized fluid to the pressurization tube 31 while the sleeves 34, 35, and 36 are still in position. It will be recognized that this expansion of the tube 30 at the designated areas provides sufficient material to envelope the structural elements desired for the fuel tank 10. For the purposes of defining the liner 11, the prestretched areas A, identified in FIG. 8, are stretched to approximately two-thirds of their final diameter in the fuel tank 10. To achieve this expansion of the tubular element 30, approximately 35 pounds per square inch of pressurized fluid, at room temperature, is applied to the pressurization tube 31.

Once the above described configuration of the tube 30 is achieved, the restrictive sleeves 34, 35, and 36 are removed from the tubular element. For this purpose the prestretched area A is collapsed to allow the sleeve 36 to be removed from the central portion of the element 30. Alternatively, the sleeve 36 may be a split sleeve and removed from the stretched area A. The resulting tube 30, then, is placed in the mold M, which is illustrated as a clamshell mold in FIG. 9, having the desired internal configuration for the liner 11. Stated differently, the mold M has an internal configuration that corresponds to the internal configuration of the tank 10. Since the fuel tank 10 includes structural elements therein, the mold M is loaded with the structural components or elements simulating the components so as to cause the plastic element 30 to be formed in accordance with their configuration. Accordingly, as illustrated in FIG. 9, two annular reinforcing structural elements 40 and 41 are mounted in the mold M on the outside of the expanded tubular element 30EX opposite the expanded areas A, along with the nonreinforcing element 42 providing a flat, hard surface for the interior of the liner 11 and which elements are arranged on opposite ends and opposite sides of the mold M. To achieve the desired configuration for the liner 11, pressure is applied to the pressurization tube 31 and is increased in preselected increments at preselected time intervals to cause the plastic material to assume the configuration of the internal cavity defined by the mold M. For example, the first pressure applied to the pressurization tube 31 initially, after the mold M is closed, is approximately 10 pounds per square inch. This initial pressure is applied at room or ambient temperature for approximately two minutes. The initial pressurization is increased at the rate of one pound per square inch for every two minutes (plus or minus one minute) from the initial 10 pounds per square inch level to 28 pounds per square inch (plus or minus 2 psi) a second pressure level. The expanded element 30EX is maintained at this 28 pounds per square inch pressure at room temperature to allow it to creep to about 90 percent of its final configuration. This creeping action is illustrated in FIG. 10 at the points identified by the reference character C around the structural elements 40, 41, and the element 42. This forming operation at room temperatures requires approximately eight hours. The time can be reduced considerably if the fluid applied to the pressurization tube is heated to approximately 100 degrees Fahrenheit (+10 degrees F.).

Assuming that the pressurized fluid applied to the pressurization tube 31 is not heated, and continuing with the forming procedure after the elapse of the eight hour period, the pressure is continually increased at one pound per square inch approximately every two minutes (plus or minus one minute) to 40 pounds per square inch, a third pressure and held at this pressure for an additional eight hours to allow the expanded element 30EX to creep into full conformance with the mold. By full conformance it is meant that the plastic liner will completely envelope the structural components 40, 41, and 42 in a close, tight fitting relationship. If the above procedure is performed by utilizing a heated fluid under pressure at 100 degrees Fahrenheit (+10 degrees F.), the forming operation can be reduced by several hours.

Alternatively, rather than following the above described procedure of pressurizing the expanded liner 30EX over time at ambient temperatures or heated temperatures, the expanded element 30EX can be formed with hot water or other compatible fluids applied to the pressurization tube 31 at a temperature of 110 degrees Fahrenheit, and starting with an unpressurized tube 31, increase the pressure applied to the tube 31 to 30 pounds per square inch linearly at increments of two pounds per square inch per minute. Over a 15 minute interval, it will achieve full mold conformance of the expanded element 30EX. It is apparent that the various configurations of the liner 11 may require unique pressure and temperature combinations for optimal and efficient processing that will have to be experimentally determined.

Many plastic or thermoplastic materials have the characteristic that they will spring back towards their original shape once the molding pressures have been removed so that the plastic can be considered as having a "memory". It is desirable in the processing of such plastic materials that this "memory" characteristic be removed so that the plastic does not spring back towards its original position, but will maintain its formed configuration. Many synthetic elastomers in the form of thermoplastics must be annealed or structurally bonded in their final form in order that they will hold their formed shape. Those materials that do not require annealing or structural bonding generally require standard thermoforming temperatures to form them into the desired configuration. This thermoforming operation, however, does not necessarily anneal the material. Thermosetting plastics which require forming prior to cross linking must be either cross linked by heating or structurally bonded to retain their formed shape. The method of forming in accordance with the present invention for the Goodrich polyurethane elastomer material includes heating the plastic material to anneal it to set it to the desired shape and thereby remove any elastic springback or "memory" in the plastic. This same process provides for cross linking and structural bonding of a thermo setting plastic.

In order to remove the "memory" capability of the Goodrich plastic material, the fully expanded plastic tube 30EX is maintained in the mold M, and is heated by an oven or any other convenient means to the desired annealing temperature for the plastic material for the required time to complete the annealing process. The fully expanded element 30EX is shown within the mold M in FIG. 11 with the heating operation illustrated in the form of heat lamps 45 applying heat to the mold M. In one specific process for annealing the aforementioned Goodrich material, the annealing process begins with reducing the pressure applied to the expanded material 30EX from its 40 pounds per square inch level to 20 pounds (third pressure level) per square inch. This step is accomplished before applying the heat lamps 45 to the mold M. The temperature applied to the mold M then is raised to 100 degrees Fahrenheit and maintained at this temperature for approximately 15 minutes. At the end of the 15 minute interval, the pressure applied to the pressurization tube 31, and thereby to the element 30EX, is lowered by two pounds per square inch down to 18 pounds per square inch while the temperature is being raised 25 degrees Fahrenheit to 125 degrees Fahrenheit. This process is repeated with time at 15 minute intervals, until the temperature has reached 200 degrees Fahrenheit, and the pressure reaches 12 pounds per square inch, the fourth pressure level. This temperature and pressure level is maintained for approximately one hour and twenty minutes. At the end of this interval, the heat lamps 45 are turned off. With the heat removed from the mold M, the pressurized liner 30EX is maintained within the mold and allowed to cool down to room temperature. Once room temperature is achieved by the mold M, the pressure then is lowered from the 12 pounds per square inch to two pounds per square inch, and the expanded plastic element 30EX is removed from the mold M. The configuration of the expanded liner 30EX when removed from the mold M is illustrated in FIG. 12. It will be recognized that the structural components 40, 41, and 42 have been removed from the expanded element 30EX, but the areas in which these elements would interfit with the element 30EX have been formed with a complementary configuration.

The next step in the procedure of forming the liner 11 for the tank 10 is to bond the elements 40, 41, and 42 to the expanded element 30EX in the form illustrated in FIG. 12. The structural components to be bonded to the expanded element 30EX are sanded and prepared for bonding, and then a film adhesive is applied to all of the surfaces of these elements that contact the expanded element 30EX in order to be bonded thereto. For this purpose, a film adhesive commercially available from Newport Adhesives, Inc., of Newport Beach, Calif., sold as the film adhesive NB-106, has been found acceptable. The adhesive coated elements 40, 41, and 42 then are positioned onto the expanded element 30EX (FIG. 12). The liner 30EX is then pressurized by applying two pounds per square inch of air pressure to the pressurization tube 31. The pressurized, expanded liner 30EX is placed in the mold M. When the mold M is closed, the pressure applied to the liner 30EX is increased to 10 pounds per square inch and held for approximately one minute; see FIG. 13. The pressure applied to the liner 30EX is then continuously increased at the rate of one pound per square inch every two minutes until the pressure of 40 pounds per square inch, a fifth pressure level, is achieved to allow the expanded element 30EX to creep into full conformance with the mold and the structural elements 40, 41, and 42 bonded thereto. The pressure applied to the expanded element 30EX is then reduced to 20 pounds per square inch and then the entire assembly held within the mold M is subjected to the heat lamps 45. The temperature applied to the heat lamps 45 initially is set at 100 degrees Fahrenheit for a 15 minute initial time interval. The heating temperature is then increased every 15 minutes by 25 degrees Fahrenheit until the final temperature of approximately 225 degrees Fahrenheit (+10 degrees F.) is reached while holding the pressurization at 20 pounds per square inch. This final temperature and pressure levels are held for approximately two hours, after which time interval the heat lamps 45 are turned off and the mold M is allowed to cool to room temperature. Once the room temperature is achieved by the mold M, the pressure to the plastic liner 30EX is reduced to two pounds per square inch, a sixth pressure level, and the mold M is opened up to allow the now formed liner 30EX with the bonded structural elements to be removed from the mold and inspected. The resulting configuration of the plastic liner 11 outside the mold M is illustrated in FIG. 14.

The resulting thin liner 11 is not self-supporting and must be further processed to make it self-supporting. In order to render the configuration of the liner 11 more rigid, a reinforcing, or stabilizing, layer is applied to it by wrapping a suitable material 12 around same. This makes the liner 11 more rigid and self-supporting for subsequent handling before final processing. To accomplish the stabilization of the formed liner 11 illustrated in FIG. 14 for the purposes of the tank 10, an adhesive impregnated glass fabric 50 is placed into the mold M over the lightly inflated liner 11. The mold M is heated to adhesively secure the liner 11 to the adhesively impregnated glass fabric 50 wrapped around it.

The specific procedure that has been utilized for stabilizing the thin liner 11 include the steps of pressurizing the liner to a pressure of approximately two pounds per square inch. A fiberglass fabric which may be a Style 120 fiberglass fabric impregnated with an epoxy adhesive has been used and is wrapped entirely around the formed liner. The Style 120 fabric, available from several commercial weavers, impregnated with NB-1106 epoxy adhesive (Newport Adhesive, Inc.) has been found acceptable. After this step is accomplished, the fiberglass fabric 50 is in turn overlayed with one layer of No. B100 peelply 51 commercially available from Hawkeye Enterprises of Los Angeles, Calif. The entire wrapped assembly is then placed back into the mold M; see FIG. 15. After the mold M is closed, the pressure applied to the liner 11 is increased to 10 pounds per square inch and held at this pressure level for approximately one minute. The pressure applied to liner 11 is then increased periodically at the rate of one pound per square inch every two minutes until a pressure of 40 pounds per square inch is reached. At this level the liner 11 is allowed to creep into full mold conformance, and the thus laminated liner is allowed to stabilize in its pressurized condition for 12 hours. At the end of approximately 12 hours, the pressure applied to the liner 11 is reduced to 20 pounds per square inch, and then the mold M is heated by turning on the heat lamps 45; see FIG. 16. The temperature is set to heat the mold M to 100 degrees Fahrenheit for 15 minuted initially. After the initial 15 minute interval, the heating temperature is increased by 25 degrees Fahrenheit every 15 minutes until a temperature of approximately 225 degrees Fahrenheit (+10 degrees F.) is reached, while maintaining the pressure at the 20 pounds per square inch. These conditions are maintained for two hours. At the end of the two hours the heat lamps 45 are turned off, and the mold M is permitted to cool back down to room temperature while the 20 pounds per square inch pressure is maintained on the liner IL. Once the room temperature is obtained by the mold M, the pressure applied to the liner IL is reduced to two pounds per square inch and it is removed from the mold. The liner IL is now ready to be filament wound and the assembly is placed in a suitable commercially available filament winding machine. After it is positioned in the filament winding machine (not shown), the laminated layer of peelply 51 is removed from the stabilized liner IL; see FIG. 17. After the usual inspection for size, conformance, and leak tightness, the liner is in condition to be filament wound.

It should be noted that, in the stabilization procedure in the actual manufacture of the fuel tank 10, the nose and tail cone polar pieces are also mounted to the liner 11 and overlayed with the reinforcing material 50 and the peelply 51 prior to placing it in the mold. Accordingly, the composite materials as removed from the mold will have the wrapped nose cone polar piece 52 and the tail cone polar piece 53 secured thereto. This entire assembly will then be filament wound.

At this point it should be noted that the wrapped liner IL can double as a mandrel for the filament winding procedure in accordance with the present invention as well as functioning as the inner liner IL for the tank 10. For this purpose, the inner liner IL has its pressure increased to four pounds per square inch in preparation for the winding procedure. The liner IL is supported in the filament winding machine through an appropriate shaft at the rotational center line that is held accurate by a controlled source of air pressure to preselected tolerances to insure a quality product. The liner IL is filament wound under pressure with the pressure being adjusted during the winding operation to offset the collapsing hoop stress induced by the high strength fibers as they are placed on the pressurized liner IL. The fiberglass epoxy windings are wound directly over the liner IL. The first layer of fiber windings, or the layer 16, is circumferentially wound directly over the liner IL. The next layer, or layer 17, is a layer of helical windings, and the third layer 18 is another layer of circumferential windings. An adhesive layer 19, which can be excess resin from windings 16, 17, and 18, or a secondary coating layer, is placed over the layer 18, and then the honeycomb element 15 is placed right over the wet windings, or adhesive layer, and formed and fitted to the contour of the inner liner IL which conforms to the contour of the tank 10. When the fire resistant properties for the tank 10 are desired, the open cells of the honeycomb element 15 are filled up with the above mentioned char forming foam. Another adhesive layer 19, as described above, is placed over the top of the honeycomb element 15. After this procedure, then, the filament winding procedure is reinstituted and three more layers of filament windings are wound around the honeycomb element 15. A circumferential winding 21 is first wound over the adhesive layer 19 covering the honeycomb core 15, with then a helical winding 22 followed by a further circumferential winding 23.

At the end of the winding operation and prior to curing of the winding resin, the pressure inside the liner IL is increased to a level equal to greater than the operating pressure of the pressure vessel or to a desired pre-stress level for a filament wound structure. The resin is then cured while the fibers are in a prestressed condition. After the resin curing operation, the pressure on the liner IL is released, causing the high tensile fibers to exert a compressive load on the weaker matrix resin. The matrix resin processed in this manner will not experience a tensile load until the fiber tensile stress load exceeds the tensile stress at the time of resin cure.

On the outside of the circumferential windings there is wound a carbon fabric or fibers 24 when a fire resistant tank is desired. This composite structure is then heated for effecting an overall cure between all of the components of the composite structure and to bond the entire unit together. After the tank is cured, it is sanded smooth and the paint layer 25 is applied thereto. Prior to painting the tank 10 it may be fitted with any appropriate fittings, nose and tail closures, tail fins, access doors, internal plumbing, valves and fuel probes, and the like, as illustrated in FIGS. 18 and 19, procedures that are not relevant to the present invention.

It should now be evident that the present invention has advanced the state of the art by the disclosure of improved containment vessels and, more particularly, crash survivable, external, aircraft fuel tanks having an internal liner that resists damage, provides a semi-self sealing action against penetrations, is fuel tight and absorbs energy upon dropping the tank, and damage without gross failures associated with prior art internal liners. The filament windings of the tank are effective in taking loads and preventing catastrophic and progressive damage due to ballistic or crash impacts. The honeycomb core is very effective in stabilizing the thin fiberglass faces of the fiberglass filaments and in providing an insulating property.

We claim:

1. A method of forming a containment vessel having an outer shell having a preselected internal volume and a preselected internal reinforcing structural element(s) and any nonreinforcing element(s) extending into the internal volume from the outer shell and a seamless, lightweight inner plastic liner covering the inner surfaces of the outer shell and any element or elements extending therefrom, including the steps of providing a seamless, pressure formable plastic tubular element having a preselected wall thickness and length, selectively expanding the tubular element at the area or areas of the tubular element corresponding to the location of said internal reinforcing structural element(s) and any nonreinforcing element(s) to a preselected diameter relative to its final diameter, forming the thus expanded tubular element in a mold having the final configuration for the plastic liner along with said reinforcing structural element(s) and any necessary nonreinforcing element(s) and pressurized to cause the tubular element to be formed into the configuration of the mold with a cavity formed to accommodate said reinforcing structural and any nonreinforcing element(s) to be mounted therein, setting the thus formed plastic liner to its final configuration while removing any "memory" inherent in the plastic element, adhesively bonding said reinforcing structural element and any nonreinforcing element(s) to the thus formed cavity or cavities, accommodating same in the plastic liner to cause the liner to be completely bonded to said reinforcing structural element(s) and any non-reinforcing element(s). throughout their extent, adhesively wrapping and bonding a preselected structural material around the thus formed plastic liner and said elements bonded thereto, and utilizing the thus formed plastic liner as a mandrel, forming an outer shell around the liner while bonding the two together to provide the containment vessel.

2. A method of forming a containment vessel as defined in claim 1 wherein the step of forming an outer shell comprises the step of winding a preselected filament/resin layer over the formed plastic liner and then winding a preselected filament/resin over a structural core interposed between the layers of filament/resin.

3. A method of forming a seamless lightweight inner plastic liner for a containment vessel outer shell having a preselected internal volume and a preselected internal reinforcing structural element(s) and any nonreinforcing element extending into the internal volume from the outer shell, including the steps of providing a seamless, pressure formable plastic tubular element having a preselected wall thickness and length, expanding the tubular element to cause the area or areas of the tubular element corresponding to the location of an internal structural element to expand to a preselected diameter relative to its desired final configuration, providing a clam shell molding having an internal cavity corresponding to the preselected final configuration for the desired plastic liner, placing the thus expanded tubular element into the mold, placing a reinforcing structural element(s) and any nonreinforcing element(s) required in the final configuration of the containment vessel in the mold on the outside of said expanded tubular element at the locations corresponding to their final location in the containment vessel, closing the mold with all of the elements placed therein, pressurizing the plastic tubular element to a preselected pressure for a preselected time interval while in the closed mold to allow the plastic element to form into conformance with the mold including creeping around said reinforcing structural and any nonreinforcing element(s) during said time interval to form the plastic liner, heating the mold containing the thus formed plastic liner to set the plastic liner and to remove any "memory" from the plastic liner to a preselected temperature for a preselected time interval, removing the heat from the mold to permit the mold to cool to ambient temperature, opening the mold and then removing the plastic liner from the mold, removing the structural element(s) and any nonreinforcing element(s) from the thus formed plastic liner, adhesively bonding structural element(s) or nonreinforcing element(s) to the thus formed plastic liner by means of heat and pressure to cause the plastic liner to be bonded to said structural element(s) and said nonreinforcing element(s) to permit the plastic liner to be completely bonded to said elements, and adhesively wrapping a structural material around the formed plastic liner and said element(s) bonded thereto.

4. A method of forming a seamless lightweight inner plastic liner as defined in claim 3 including the step of utilizing the thus formed plastic liner as a mandrel and forming an outer shell on the plastic liner and bonded thereto to thereby provide the desired containment vessel.

5. A method of forming a seamless, lightweight inner plastic liner for a containment vessel outer shell having a preselected internal volume and a preselected internal reinforcing structural element(s) extending into the internal volume from the outer shell, including the steps of providing a seamless, pressure formable plastic tubular element having a preselected wall thickness and length, pressurizing the tubular element to cause areas of the plastic tubular element corresponding to the location of an internal structural element(s) to be expanded to a preselected diameter relative to its final configuration, providing a mold having an internal cavity corresponding to the preselected final configuration for the plastic liner, placing the thus expanded tubular element into the mold, placing a structural reinforcing element(s) in the mold on the outside of said expanded tubular element and at the location or locations corresponding to their final location in the containment vessel, closing the mold with the thus positioned tubular element and reinforcing structural element(s) therein, pressurizing the plastic tubular element to a preselected first pressure while maintained in the mold and then continuously increasing the pressure applied to the plastic tubular element in preselected increments at preselected time intervals until a second preselected pressure is reached, maintaining the preselected second pressure on the plastic tubular element for a preselected time interval to allow the plastic tubular element to creep into conformance with the mold configuration including creeping around said structural element(s) during said preselected time interval, continuously increasing the second pressure applied to the plastic tubular element in preselected increments at preselected time intervals until a third preselected pressure level is reached, maintaining the latter mentioned preselected third pressure leval on the plastic tubular element for a preselected time interval to permit the plastic tubular element to creep into conformance with the mold and the element(s) that have been mounted therein, heating the thus formed tubular plastic element as formed in the mold and the mold to a preselected temperature to set the thus formed plastic tubular element and to remove any "memory" from the plastic tubular element to a preselected temperature for a preselected time interval while reducing the third pressure level within the plastic tubular element to a fourth preselected level, removing the heat from the mold containing the plastic tubular element at the latter mentioned preselected time interval while allowing the mold containing the plastic to cool at the ambient temperature for a preselected time interval, reducing the pressure applied to the plastic tubular element within the mold and then removing the plastic tubular element from the mold, removing said reinforcing element(s) from the thus formed plastic liner, applying adhesive to said reinforcing structural element(s) to be bonded to the thus formed plastic liner, placing the formed plastic liner and adhesive covered structural element or elements into the mold at locations corresponding to their location or locations on the plastic liner, closing the mold with the plastic liner and adhesive covered structural element(s) therein, pressurizing the plastic liner for a preselected time interval to a fifth preselected pressure level to permit the liner to creep into full mold conformance and then reducing the fifth level of pressure applied to the plastic liner to a sixth pressure level, heating the mold containing the pressurized plastic liner to a preselected temperature for a preselected time interval, removing the heat from the mold containing the pressurized plastic liner and cooling the mold to room temperature, reducing the pressure applied to the plastic liner when the mold has been cooled to room temperature and then removing the plastic liner with bonded structural element(s) from the mold, and adhesively wrapping and bonding a fiberglass fabric around the complete plastic liner assembly including all reinforcing structural elements.

6. A method of forming a seamless, lightweight inner plastic liner for a containment vessel outer shell as defined in claim 5 wherein said formable plastic tubular element is constructed from a B. F. Goodrich Estane polyurethane 58277 compound.

* * * * *

UNITED STATES PATENT AND TRADEMARK OFFICE
CERTIFICATE OF CORRECTION

PATENT NO. : 4,584,041
DATED : April 22, 1986
INVENTOR(S) : Richard R. Lyman et al.

It is certified that error appears in the above-identified patent and that said Letters Patent is hereby corrected as shown below:

Column 2, line 19, "comptible" should read -- compatible --.

Column 3, line 33, "accomodate" should read -- accommodate --.

Column 8, lines 23 and 24, "accorance" should read --

-- accordance --.

Column 12, line 26, after "inch" insert -- a sixth pressure level --.

Column 12, line 41, delete "a sixth pressure level --.

Column 13, line 20, "minuted" should read -- minutes --.

Column 14, line 32, after "windings" add the numeral -- 23 --.

Signed and Sealed this

Sixth Day of January, 1987

Attest:

DONALD J. QUIGG

Attesting Officer

Commissioner of Patents and Trademarks